M. H. MALONEY.
FILTER.
APPLICATION FILED FEB. 14, 1913.

1,113,365.

Patented Oct. 13, 1914.

Witnesses:
Louise A. Jordan
Katherine L. Murphy

Inventor:
Michael H. Maloney,
by Clyde L. Rogers
his Attorney.

UNITED STATES PATENT OFFICE.

MICHAEL H. MALONEY, OF PLYMOUTH, MASSACHUSETTS, ASSIGNOR OF ONE-HALF TO JOHN J. BUCKLEY, OF PLYMOUTH, MASSACHUSETTS.

FILTER.

1,113,365.  Specification of Letters Patent.  Patented Oct. 13, 1914.

Application filed February 14, 1913. Serial No. 748,343.

*To all whom it may concern:*

Be it known that I, MICHAEL H. MALONEY, a citizen of the United States, and resident of Plymouth, county of Suffolk, State of Massachusetts, have invented an Improvement in Filters, of which the following description, in connection with the accompanying drawings, is a specification, like characters on the drawings representing like parts.

My present invention relates to filters adapted either for household and domestic, or for public or for semi-public installations, being suitable to be readily applied to any required use.

Among the prime objects of the invention are to provide water purifying means consisting of strainer and filter elements adapted to be easily and quickly assembled in place in a container barrel, and as quickly removed when required for inspection or cleaning; the filter and strainer elements being for this purpose held assembled by yielding frictional pressure against the sides of the container barrel and being also formed so as to be held in place and against displacement by the pressure of the water passing therethrough.

A further object of the invention is to provide a construction of filter and strainer members which combines to a large extent the advantages of the tubular type with the extended filtering surface provided thereby, with the advantages of the flat or plate type of device with its capability of being easily and cheaply stamped out of sheet or plate material.

To these ends the invention consists in a filter barrel preferably of generally cylindrical form having a lateral water inlet and outlet opposite each other, and of strainer and filtering means of preferably of generally half round form held assembled in the barrel by the yielding frictional action of the strainer members, and also by the pressure of the water passing therethrough.

The above and other objects and features of the invention will be better understood from the following detailed description taken in connection with the accompanying drawings and will be thereafter pointed out in the appended claims.

Figure 1:
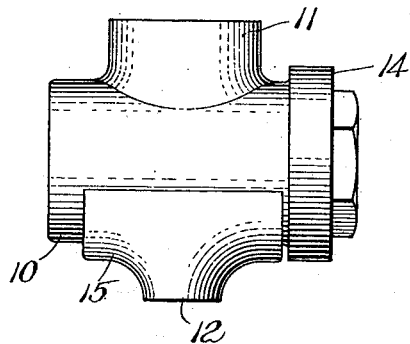
Figure 2:
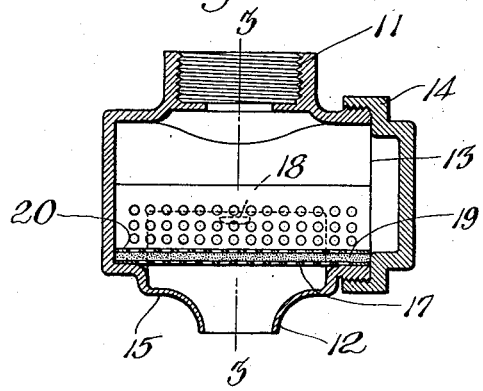
Figure 3:
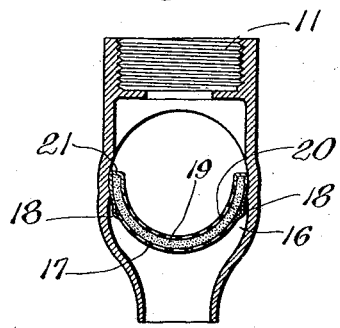

Referring to the drawings: Figure 1 is a side elevation showing one form of my improved filter; Fig. 2 is a central longitudinal vertical section thereof; and Fig. 3 is a transverse section on line 3—3 of Fig. 2.

The filter casing is formed as a tubular barrel 10 normally horizontal with a water inlet connection 11 shown as a usual internally threaded collar at its top, and a discharge nozzle or spout 12 at its bottom and diametrically opposite the inlet. This container barrel is open at one end as seen at 13, with a closure cap 14 threaded thereon for convenient removal to reach the interior of the filter barrel. The barrel has an enlarged dished out portion 15 underneath, where it opens to the discharge spout 12, this dished out portion preferably extending over most of the length of the barrel as seen in Fig. 2, and extending downward the full diameter of the barrel or more in transverse section as seen at 16 in Fig. 3, thus providing an enlarged area for the passage of water through the filter and strainer members. The water purifying means which I prefer to employ consists in two half round strainer plates, with an interposed filter pad or like filtering means, which are assembled and held pressed together as they are inserted into the container barrel by yielding spring pressure of the strainer plates as later more fully described. The lower half round strainer plate 17 is preferably stamped or struck out of sheet or plate metal of a size to snugly fit the interior of the barrel when pressed thereinto. This strainer plate is preferably formed with struck out projections 18 shown as rounded, at each side, in position to lie adjacent the extremities of the dished out formation 15 to thus resist displacement of the strainer plate by turning around in the barrel. It will be observed that the rounded character of these projections permits the strainer plate to be pressed to place with a yielding spring action in the barrel, the projections slipping over the slight shoulders at the sides of the dished out formation 15, and the sides of the strainer yieldingly pressing against the sides of the container barrel. The filter pad or layer 19 may be of any suitable material for the purpose, such as a felt pad or other suitable filtering means. This pad is held securely assembled between the outer filter plate 17 and the inner filter plate 20 with a yielding frictional grip as the members are pressed to place, and the inner plate 20 is preferably equipped with spacing flanges 21 struck out to extend over the ends of the filter pad into approximate engagement to the walls of the container. In this manner the filter and strainer members are securely held yet with a capability of easy removal as by the insertion of the finger into the filter barrel whereby these members can be easily pulled out for cleaning and replaced.

The described construction with the half round strainer members, and the filter pad interposed between them in the barrel chamber is valuable and important in that the half round strainer members are adapted to be easily inserted in and removed from the barrel chamber with the filter pad interposed between and when assembled the strainer members by reason of this half round construction are held in place, and also reliably hold the filter pad between them with a spring frictional engagement, resulting from a small springing in of the strainer members as they are pressed to place in the barrel, thus effecting a secure assembling of the parts without any special clamping means or any holding or guiding relation with the ends of the barrel. This frictional holding provision resulting from the half round construction in connection with the small struck out projections on the bottom strainer which coöperate with the shoulders at the sides of the dished out part of the barrel not only holds the strainer parts and the filter properly assembled but prevents any turning displacement thereof in the barrel.

It is to be further noted that the half round construction of strainer and filter combines the advantages of a cylindrical type with its extended filtering surface, with that of the flat type in that with this half round type, both the strainer members and the filter pad are adapted to be blanked out from sheet stock without any loss of material as is the case with the tubular type.

It is to be observed that the special construction of my improved filter is also such as to leave every part accessible so that it may be readily cleaned by the mere unscrewing of the cap and the drawing out of the strainer members by the finger, the strainer parts and the filter pad being by this one movement disassembled and ready for instant cleansing individually, there being no corner or other lodging place where germs could collect or lodge. The small rounded struck out projections on the outer strainer offer no hindrance to the easy and complete cleaning and polishing of the strainer as is ordinarily the case where special holding means have to be provided. A still further distinctive advantage of the described half round type of filter with the strainer members assembled at the outlet side of the barrel as described, is that the pressure or impact of the water as it is exerted against the filter is in the direction to press the same more firmly to its seat increasing the frictional hold of the sides of the strainer members on the barrel so that the filter is rendered still more secure against displacement, this being a distinction to be noted over the cylindrical type of filter wherein there is no such pressing of the filter to any seat since the pressure is balanced all around the circular area.

Having described my invention, what I claim as new and desire to secure by Letters Patent is:

1. A filter comprising a barrel chamber with an inlet at one side and an outlet at an opposite side, and water purifying means consisting in half round strainer members having yielding frictional engagement with the barrel wall to cover the outlet and with a filter pad frictionally held therebetween by the spring action of said strainer members.

2. A filter comprising a barrel chamber having an inlet at one side and an outlet at an opposite side, the barrel having an enlarged dished out portion surrounding said outlet, and water purifying means consisting in half round strainer plates fitted one within the other in said barrel to cover said dished out portion there being filtering means interposed between said strainers, and said strainers and filtering means being held in place by yielding frictional engagement.

3. A filter comprising a barrel chamber having an inlet at one side, and an outlet at an opposite side, there being an enlarged dished out portion around said outlet, and water purifying means consisting in an outer half round strainer with struck out projections engaging shoulders at the sides of said dished out portion, an intermediate filtering member, and an inner strainer member of curved part round form, said strainer members being formed and adapted for coöperation to hold said filter member assembled between them with the yielding spring action and with a capability of manual displacement.

4. A filter comprising a barrel chamber having an inlet, and a lateral outlet, there being a dished out portion around said outlet, and water purifying means formed to be displaceably held in said barrel chamber by spring frictional engagement with the lateral walls thereof.

5. A filter comprising a barrel chamber having an inlet, and a lateral outlet, and water purifying means part circular in cross section, formed to yieldingly engage the sides of said barrel chamber to be held against casual displacement but with a capability of easy manual removal.

6. A filter comprising a barrel chamber having an inlet and a lateral outlet with an enlarged dished out portion around said outlet, and a half round strainer member covering said outlet formed to engage the sides of said barrel chamber with a yielding fit and having struck out projections engaging the sides of said dished out portion.

7. A filter comprising a barrel chamber generally circular in cross section with an inlet at one side, and an outlet at an opposite side, and water purifying means consisting in half round strainer members in nested relation with an interposed filter pad, fitted in said chamber with their convex side toward the water outlet, said strainer members being adapted to hold the filter pad in securely assembled relation by the impact of water against the concave side thereof, but with a capability of easy manual removal.

In testimony whereof, I have signed my name to this specification, in the presence of two subscribing witnesses.

MICHAEL H. MALONEY.

Witnesses:
CLYDE L. ROGERS,
LOUISE A. JORDAN.